United States Patent [19]
Cooper et al.
[11] 4,190,845
[45] Feb. 26, 1980

[54] ELECTRIC FIELD ORIENTATION FOR INK JET PRINTERS FOR VERTICAL AND HORIZONTAL PRINTING

[75] Inventors: Leon M. Cooper; Walter J. Wipke, both of Lexington, Ky.

[73] Assignee: International Business Machines Corporation, Armonk, N.Y.

[21] Appl. No.: 973,056

[22] Filed: Dec. 22, 1978

[51] Int. Cl.[2] .................... G01D 15/16
[52] U.S. Cl. .................... 346/75; 400/126
[58] Field of Search .................... 346/75; 400/126

[56] References Cited

U.S. PATENT DOCUMENTS

| | | | |
|---|---|---|---|
| 3,298,030 | 1/1967 | Lewis | 346/75 |
| 3,972,052 | 7/1976 | Atumi | 346/75 X |
| 4,075,636 | 2/1978 | Galetto | 346/75 |

*Primary Examiner*—Joseph W. Hartary
*Attorney, Agent, or Firm*—William J. Dick

[57] ABSTRACT

Disclosed is an ink jet printer having the capability of printing both vertically and horizontally. This is accomplished by mechanical orientation of the electric field associated with the deflection plates. In a first embodiment, the plates are mounted in such a manner as to permit rotation manually, for example, by a handle which interconnects the two plates and permit rotation thereof about the axis of the ink drop stream. In an alternate embodiment, the deflection plates are comprised of two pairs, a horizontal pair and a vertical pair which are shiftable into and out of operating position to effect the desired ink drop deflection.

25 Claims, 7 Drawing Figures

ELECTRIC FIELD ORIENTATION FOR INK JET PRINTERS FOR VERTICAL AND HORIZONTAL PRINTING

SUMMARY OF THE INVENTION

The present invention relates to ink jet printers of the Sweet type, and more particularly relates to ink jet printers having the ability to print both vertically and horizontally.

STATE OF THE PRIOR ART

In the Sweet type ink jet printing system, such as is disclosed in U.S. Pat. No. 3,596,275, issued on July 27, 1971 to Richard G. Sweet, a perturbated stream of ink drops is emitted from a nozzle under pressure, the stream breaking up into small drops at a predetermined point or distance from the nozzle. As the droplets are formed, they receive a charge in a charge ring or electrode and then pass between a pair of deflection electrodes which are charged to a high voltage. The amount of the charge placed on the ink drop by the charge electrode determines the deflection height of the ink droplets so that characters or other indicia may be formed on an ink drop receiving medium such as paper or the like adjacent to the discharge side of the deflection electrodes. Typically, if no indicia are to be formed, the drops receive no or little charge and as a consequence are not deflected when passing through the deflection electrodes, the drops then passing into a gutter for recirculation in the ink system. A typical marketplace example of an ink jet printer which incorporates the principles heretofore described is the IBM 6640 and 6650 Office System 6 incorporating an ink jet printer which operates substantially as described above.

As may be seen from the above description, the vertical deflection of the drops is used to form a column of ink dots (this is called a scan) at the paper or ink drop receiving medium plane. Each successive drop in a scan is given a slightly greater charge so that the scan is constructed, in the example given, from bottom to top. Thus the characters are formed within a particular matrix by making a succession of scans. Typically, the printhead elements are located on a movable carrier that travels in a predetermined path along the print surface cooperating with the vertical scan to provide the means for printing characters or other indicia on the print receiving medium or print surface.

In certain languages, such as Japanese, the language may be written either vertically or horizontally on the ink drop receiving medium. Thus it is mandatory that the ink stream be deflected vertically for horizontal printing and horizontally for vertical printing (or use a "step and repeat" type function). Of course, it would appear to be obvious to accomplish both horizontal and vertical deflection by providing horizontal and vertical deflection pairs so that energizing selected ones of the pairs, printing could occur either horizontally or vertically. However, with a scheme of this type, the non-energized plates tend to build up with ink mist and the like creating a cleaning problem in the apparatus. Secondly, conventionally, the power supply associated with the deflection electrodes is of necessity at a very high voltage, making switching of the power supplies from one plate pair to the other plate pair difficult normally requiring shutting off the supply prior to switching. As an alternative, of course, the power suplies may be duplicated, but the system described herein does not require a duplication of power supplies nor other attendant electrical circuitry for its correct operation.

In view of the above, it is a principle object of the present invention to alter the electric field orientation in an ink jet printer so as to enable both vertical and horizontal printing.

Another object of the present invention is to allow the use of a single plate pair for forming the deflection electric field for both vertical and horizontal printing so that only one plate pair has to be maintained within the vicinity of the ink stream (and energized) at one time.

With regard to the prior art, U.S. Pat. No. 3,715,219, issued on Feb. 6, 1973; U.S. Pat. No. 3,786,516, issued Jan. 15, 1974; U.S. Pat. No. 3,938,163, issued on Feb. 10, 1976; all illustrate both horizontal and vertical deflection electrodes although not for the purpose of printing in one or the other direction. The above cited references illustrate electrical means for altering the electrical field for one purpose or another, for example, to compensate for the lateral seed of the stream of ink dots as it is printed. None of the references illustrates the mechanical movement of the plates either into position or by rotating the plates so that the ink jet printer may print vertically or horizontally.

Other objects and a more complete understanding of the invention may be had by referring to the following specification and claims taken in conjunction with the accompanying drawings in which:

DESCRIPTION

BACKGROUND INFORMATION

Figure 1:
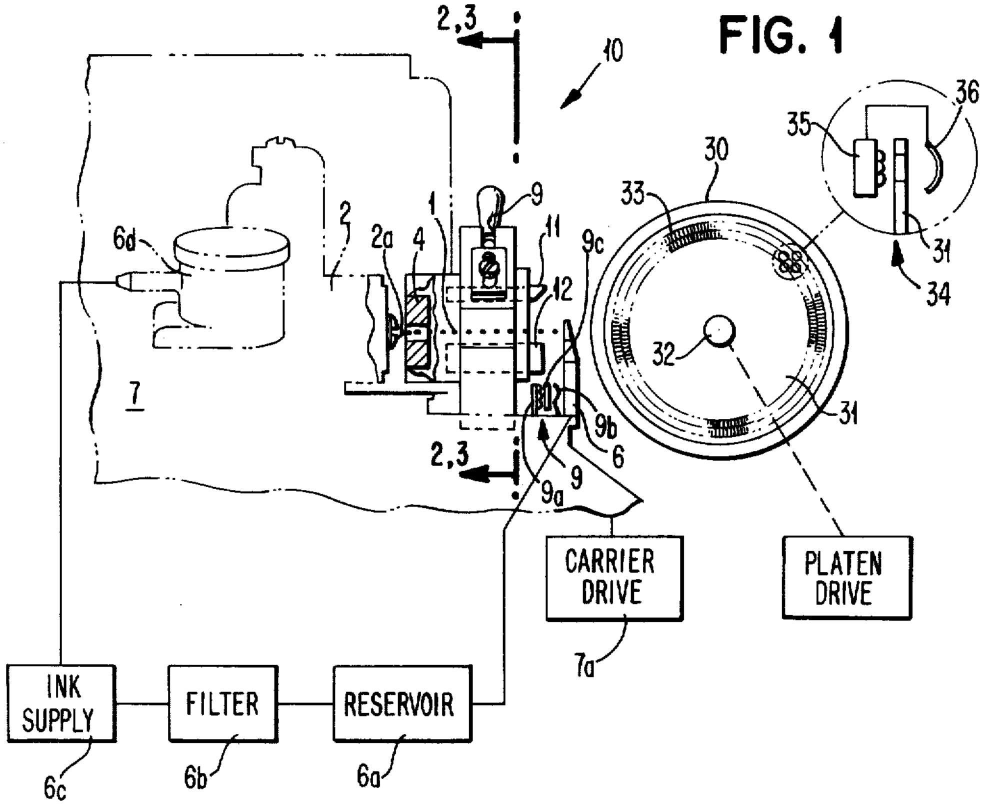
FIG. 1 is a fragmentary side elevational and schematic view of an ink jet printer incorporating the apparatus of the present invention.

Referring now to the drawings, and especially to FIG. 1 thereof, an ink jet printer constructed in accordance with the present invention is schematically illustrated therein. Basically, ink 1 under pressure is forced through a nozzle 2*a* as from a drop generator to form jet. While the jet would normally breakup into a stream of drops of quasi-random size and spacing, drop formation is controlled by vibrating the ink within the nozzle cavity (not shown) at a fixed ultrasonic frequency as by a crystal driver (not shown), the crystal driver exciting a piezo-electric crystal within the drop generator 2. The pressure waves cause the jet 1 to break up into a stream of drops of uniform size and spacing at a well defined distance from the nozzle 2a. A typical drop generator structure is illustrated in IBM Technical Disclosure Bulletin, Vol. 21, No. 5, October 1978 at pages 1949, 1950.

A voltage applied to a charge electrode 4 surrounding the breakup point (jet stream into drops) induces an electrical charge of a specific predetermined magnitude on the forming drop. This charge is retained by the drop throughout its flight to a drop receiving medium such as a platen 30 holding paper or the like.

The stream of drops passes through an electric field formed by a fixed high voltage between a pair of horizontally disposed deflection plates 11 and 12 respectively. Because the charge on each drop is controlled individually, a drop may be deflected vertically a desired and predetermined amount. In the instance of the IBM 6640 document printer, the drops are deflected vertically from bottom to top, one column of dots and/or spaces being referred to herein as a scan. If in forming a character, or other indicia, a particular space in the scan is to be left white, (unprinted) it is blanked by leaving the drops uncharged. These uncharged or undeflected drops are intercepted by a gutter 6 and recycled to an ink reservoir 6a through a filter 6b, an ink supply reservoir 6c and from there to the suction side of an ink pump 6d. The pump supplies ink on a continuing basis therefor to the drop generator 2. A typical ink recirculation system for ink jet printing apparatus is disclosed in U.S. Pat. No. 3,929,071, issued on Dec. 30, 1975 to the assignee of the present invention. Moreover, inasmuch as the height that the deflected drop will appear on the print receiving medium or paper held by the platen 30 is directly related to the residence time of the drop between the deflection plates 11 and 12 indicates that the velocity of the ink droplet or ink jet stream must be accurately controlled. In U.S. Pat. No. 3,787,882, issued on Jan. 22, 1974, is disclosed a number of servo systems for controlling the velocity of the stream by sensing the velocity and then servoing the pump to obtain the desired pressure within the drop generator 2. Another means of determining the velocity of the drop for obtaining servo control of the ink pump in order to control the velocity of the ink stream is disclosed in patent application Ser. No. 843,081, filed on Oct. 17, 1977 of K. Meece et al, and owned by the assignee of the present invention.

The drop generator 2, charge electrode 4, deflection plates 11 and 12, and gutter 6 are all mounted on a carrier 7 which is driven horizontally along a predetermined print path, that is into and out of the plane of the paper in FIG. 1, at a relatively constant speed during the printing operation. In this manner, drops are deposited in appropriate positions within a character box or raster area to form the desired indicia or character. In this connection, the carrier 7 is driven into and out of the paper plane by a carrier driver 7a, for example a DC motor, and in a controllable manner which is under control of system electronics (not shown). The carrier driver 7a, and the necessary system electronics employed for movement of the carrier into and out of the plane of the paper in FIG. 1 is fully set forth in co-pending patent application Ser. No. 954,374 of Morgan et al, filed Oct. 24, 1978, and owned by the assignee of the present invention, which application is herein incorporated by reference. It should be noted that the electric field is substantially perpendicular to the direction of movement of the carrier.

With the ink jet printer in operation, either in an interactive or on the fly or continuous printing mode, it is mandatory that some means be provided for indicating where the carrier is at any particular time so that the start of each scan may be determined in order that the charge electrode may receive the correct data or voltage level for proper deflection of the ink drops. Moreover, there must be some means provided for determining the direction of motion of the carrier. In this connection, a detector 9 which includes a light emitting and receiving matrix 9a, and a concave mirror 9b are disposed on the carrier on opposite sides of a fixed grating strip 9c (mounted on the machine frame). The grating strip 9c in conjunction with the matrix and mirror permit the output of signals to the system electronics for both charge electrode charging purposes as well as for controlling the carrier drive 7a connected to the carrier 7. In this connection, the detection apparatus and scheme is disclosed more fully in the Cialone and West patent application, Ser. No. 920,305, filed on June 28, 1978, and owned by the assignee of the present invention and herein incorporated by reference. Moreover, the detection circuitry employed, while being disclosed in the aforementioned co-pending application, is also described in the co-pending application of Pettit, Ser. No. 920,306 also filed on June 28, 1978 and incorporated herein by reference. The grating 9c is a dual grating having opaque and transparent interdigitations, one grating portion being offset from another grating portion by 90°. The detector matrix includes a pair of light sources and a pair of detectors, light passing through the grating is then reflected by the mirror 9b and impinges on the detectors which, with their associated circuitry produces an alternating signal which, in conjunction with a counter, counts the transitions (opaque to transparent), and thereby indicates the absolute position of the carrier 7 at any point during its traverse along the print path.

DESCRIPTION OF THE INVENTION

In accordance with the invention, means are provided for altering the electric field intermediate the deflection electrodes 11 and 12 so as to effect either horizontal or vertical printing. To this end, and referring first to FIG. 2, alteration of the electric field intermediate the deflection electrodes 11 and 12 is accomplished by mechanical rotation of the electrodes from a position shown in FIG. 2, for horizontal printing (conventional) and to the position illustrated in FIG. 3 for vertical printing.

As illustrated, in the preferred mode or embodiment of the invention, the deflection electrodes 11 and 12 are mounted in a ring or cylinder 13 having a central bore 13a, the deflection electrodes 11 and 12 projecting inwardly into the bore 13a and having confronting spaced apart surfaces 11a and 12a respectively which are preferably an equal distance from the central axis of the nozzle 2a. As illustrated in FIG. 1, the deflection electrodes may extend rearwardly of the ring or cylinder 13. Moreover, the charge electrode 4 may be placed in the ring adjacent the nozzle 2a or may be mounted separately, depending upon the design of the electrode.

Figure 2:
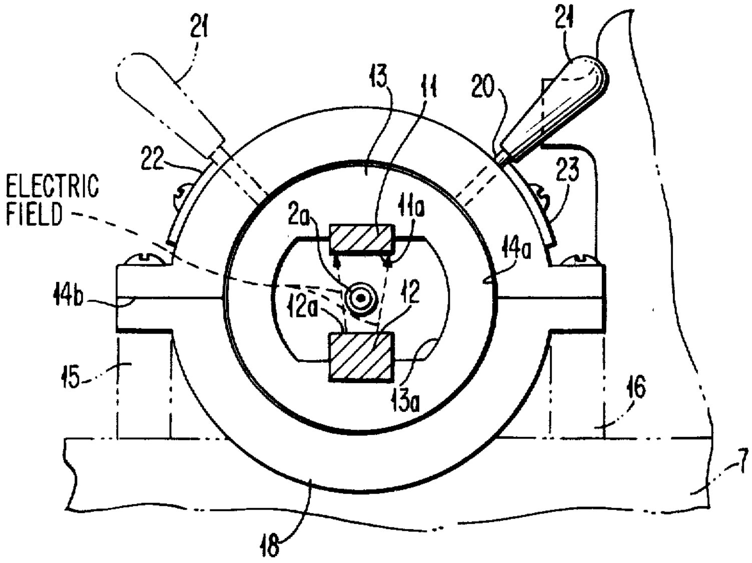
FIG. 2 is an enlarged fragmentary sectional view of a portion of the apparatus illustrated in FIG. 1, and taken along line 2—2 of FIG. 1.
Figure 3:
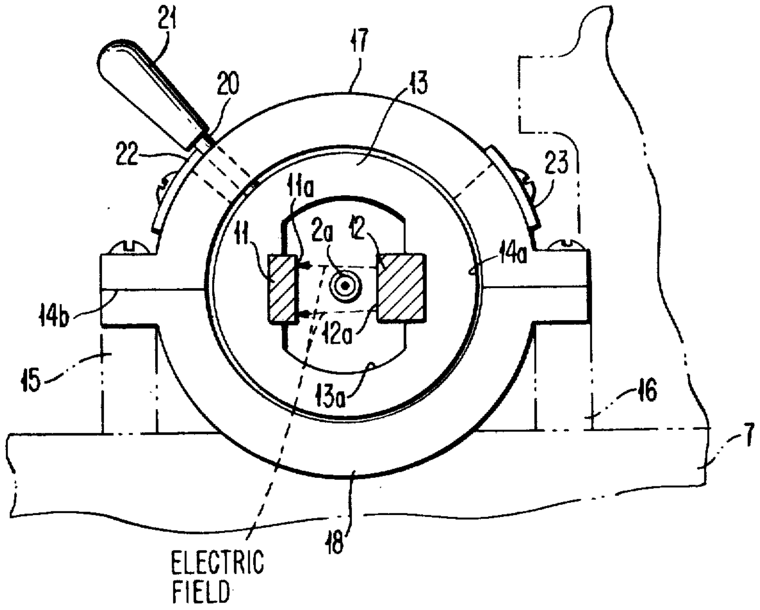
FIG. 3 is a view of the apparatus illustrated in FIG. 2 but showing portions thereof in a different position and as taken along line 3—3 of FIG. 2.

In order to permit orientation of the deflection electrodes 11 and 12 so that the electric field orientation may be altered from the position shown in FIG. 2 to the position shown in FIG. 3 (i.e., from a vertical orientation of the electric field, as shown in FIG. 2 to a horizontal orientation of the electric field as would occur with the deflection electrodes in the position illustrated in FIG. 3), the ring 13 is mounted for rotation within a pedestal mount ring or sleeve 14 which is connected, as by pedestal supports 15 and 16 to the carrier 7. The pedestal sleeve 14 includes a bore 14*a* which is dimensioned to receive the cylinder or ring 13. As shown, the sleeve 14 may be conveniently split as along parting line 14*b* forming an upper half 17 and a lower half 18. As illustrated, the upper half 17 of the pedestal mount or sleeve 14 may include a radially and peripherally extending slot 19 to permit the passage thereinto of shifting means, in the illustrated instance, a rod like member 20 which may be connected to the ring or cylinder 13 at its extended terminal end, and terminate externally of the upper half 17 of the pedestal mount or sleeve 14 in a handle portion 21.

In order to limit the excursion of the shifting means or rod 20 and handle combination 21, adjustable stop means 22 and 23 may be connected to the periphery of the upper half 17 intersecting the slot 19 so as to permit proper positioning of the shifting means and thus the cylinder 13 for proper location of the deflection electrodes 11 and 12 for both horizontal and vertical printing.

It should be recognized that the means for shifting the sleeve or ring in order to effect a rotation of the electric field from its vertical position such as shown in FIG. 2 to the horizonatal position such as shown in FIG. 3 to permit vertical scans in the first instance and horizontal scans in the second instance may be accomplished by any convenient means, for example solenoids, rack and pinion drive, etc. but for simplicity purposes, the means suggested herein is preferred.

In the IBM 6640 Ink Jet Printer, the deflection electrodes are fixed and in the general position indicated by the electrodes 11 and 12 in FIG. 2. The circuitry necessary to accomplish the functions necessary in printing are disclosed in U.S. patent application Ser. No. 960,417 filed on Nov. 13, 1978, Buehner, et al and owned by the assignee of the present invention. A superior carrier drive and its associated electronics which mates with the electronic circuitry of, for example, the IBM 6640 Ink Jet Printer is fully set forth in co-pending patent application Ser. No. 954,374 of Morgan, et al filed on Oct. 24, 1978.

In order to modify such a printer so that it is capable of printing not only in the horizontal direction, that is with a deflection electrode orientation such as illustrated in FIG. 2 but to also be able to print in the vertical direction with an electrode orientation such as shown in FIG. 3, it is necessary that the platen of the printer (whether it be interactive or non-interactive) be driven in substantially the same manner as the carrier 7 is driven by the carrier drive 7*a*. The platen drive may take any conventional form with the exception that it is necessary for the printer electronics to be able to ascertain the location of the paper carried by the platen to permit, for example, starting and stopping to allow for end of paper functions, margin functions, position of first character, etc. To this end, the platen 30 may include an encoder wheel or disc 31 which is connected to the shaft 32 of the printer. The encoder wheel or disc 31 may include a grating 33 identical to the grating 9*c* described in the aforementioned Cialone and West applications, except that the grating 33 is circular. Moreover, the grating may include the detector 34 which is identical to the detector matrix described in the Cialone and West applications, including a light emitting and receiving matrix 35 and mirror 36 between which rotates the disc 31. In this manner, a suitable interruption in the grating may serve as an initiating or starting point for platen rotation, allowing the platen drive, which may be identical to that disclosed in the Morgan, et al application to effect rotation of the platen. It should be recognized, however, that numerous other drives may be employed for effecting both carrier and platen movement, the drive suggested being that which is, in the illustrated instance, preferred.

Figure 4:
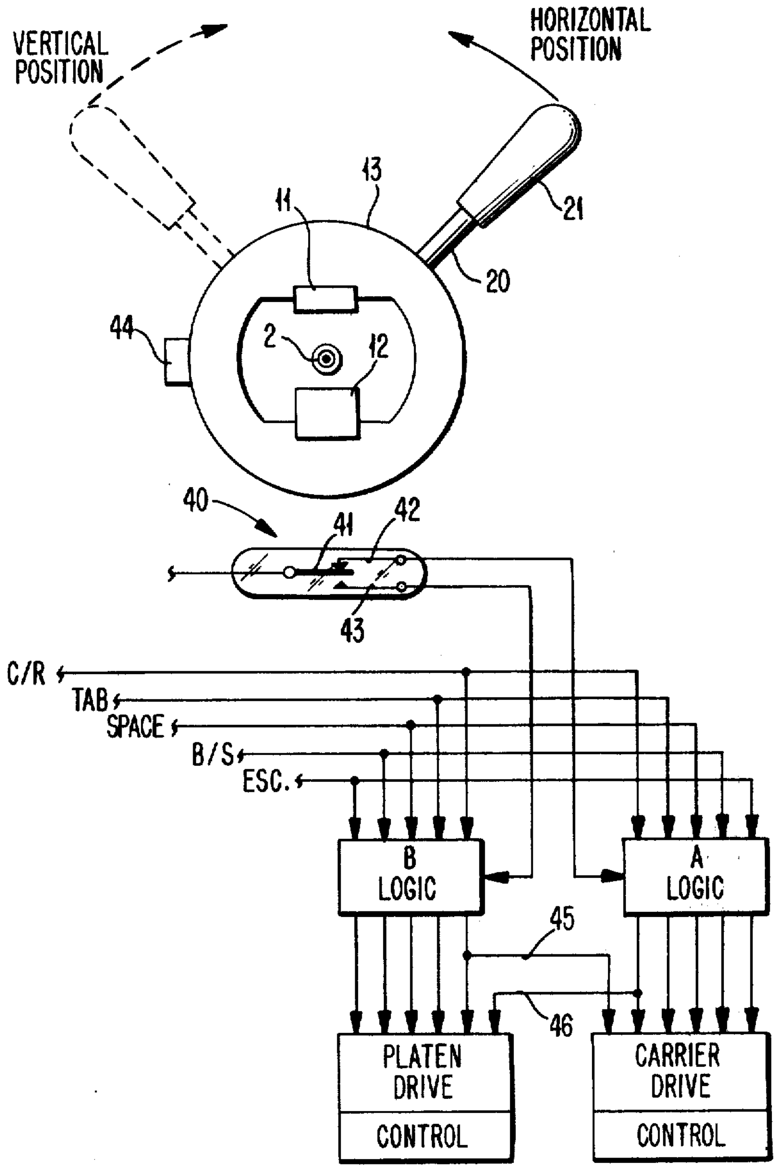
FIG. 4 is a schematic diagram illustrating the apparatus of FIGS. 1-3 in the positions illustrated in FIGS. 2 and 3 and its interconnection to the carrier drive and platen drive of the printer.

Turning now to FIG. 4, the cylinder or ring 13 mounting the deflection electrodes 11 and 12 is illustrated schematically in the position for printing horizontally, i.e., the electric field orientation is vertical and therefore the scan of ink drops is in the vertical direction. In order to insure that the functions called for, as by a microprocessor control such as employed in the Office Systems 6 which is utilized in conjunction with 6640 Ink Jet Printer for such functions as carrier return, tab, space, backspace, and normal escapement will operate to drive either the carrier drive, or the platen drive, or both (for example, for shifting a line to effect platen indexing when printing horizontally, or carrier drive when shifting from one column to the next column when printing vertically), a minor modification must be made to the existing electronics so that one or the other of the drive controls is initiated and controlled during the printing operation. To this end, and as illustrated in FIG. 4, the ring or cylinder 13 may include means thereon for switching the machine control from either carrier drive (when printing horizontally) to platen drive (when printing vertically). In the present instance and as illustrated, the switching means comprises a switch 40 having a single pole 41 which operates between an upper contact 42 and a lower contact 43. When the switch is in its normal position such as illustrated in FIG. 4, all signals for the aforementioned functions may be applied to the carrier drive control while when printing in the vertical direction, the switch will move downwardly the pole contacting contact 43 thereby disabling the logic A associated with the carrier drive control and enabling logic B associated with the platen drive control. The logic in both logic A and logic B may be comprised of a plurality of two input AND gates, the common inputs being from the contacts 42 and 43 respectively of the switch 40. Thus when contact 42 is made, such as illustrated in FIG. 4, the first input of all of the AND gates within logic A will be up requiring only a second input on one or more of the function inputs labeled C/R (carrier return), tab (tabulation), space, B/S (backspace) and ESC (escapement) in order to provide a suitable output for the carrier drive control. In a like manner, when the pole 41 is in contact with switch contact 43, the logic B is enabled by all of the AND gates therein receiving a first input so that the remaining function inputs can be applied to the separate AND gates which will give a logic output sufficient for driving the platen drive control.

In order to move the switch pole 41 between the first contact 42 and the switch contact 43, the switch may be a magnetically operated switch, the cylinder or ring 13 including a magnet 44 thereon so that when the shifting means is moved from the horizontal position (solid lines, FIG. 4) to the dotted line position or vertical position illustrated in FIG. 4, the magnet rotates in a counterclockwise direction causing the switch to move from its first position to its second position. In this manner, the logic relating to the carrier drive control may be selected or the logic relating to the platen drive control may be selected.

The output lines from carrier return, i.e., lines 45 and 46 are cross connected such that when a carrier return signal is provided on the C/R function line, the platen drive may be actuated, for example for a predetermined time period to allow the platen to advance for the next line of printing. In a like manner, when the pole of the switch 41 is in contact with switch contact 43, and printing is occurring in the vertical direction, upon a carrier return signal being supplied to the B logic and the platen drive control, a signal will also be applied to the carrier drive control indicating to shift the carrier a predetermined amount along the printing path in the horizontal direction. In this manner, a carrier return signal may be employed to cause shifting or advance of the printing position regardless of the print mode.

Figure 5:
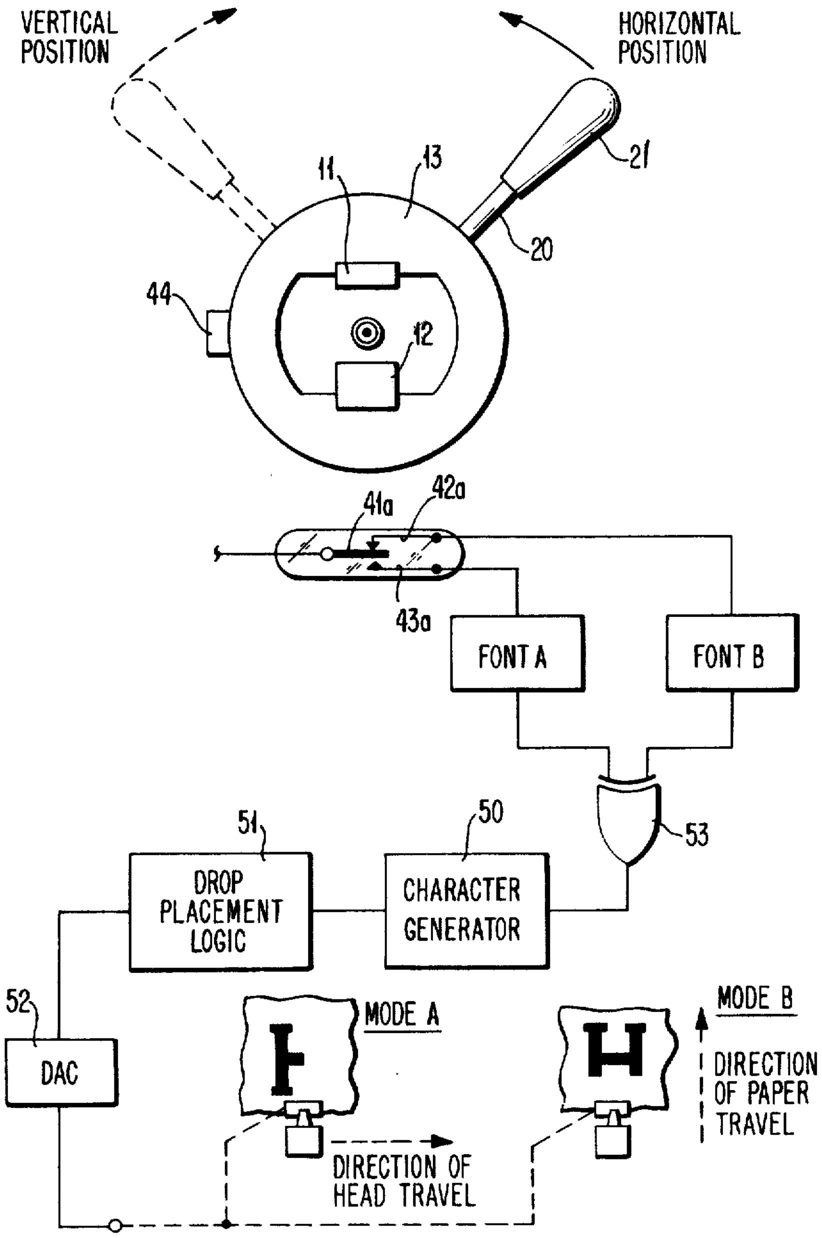
FIG. 5 is a fragmentary sectional schematic view similar to FIG. 4 and indicating schematically the circuitry necessary to shift the printer to enable proper character representation in both the horizontal and vertical print modes.

Additionally, inasmuch as when printing horizontally, the field orientation as well as the scan is vertical, and when printing vertically the field orientation and scan of the ink drops is horizontal, it is necessary that the scan information that is being fed to the charge electrode 4 associated with the printer have the font information (scan information) shifted by 90°. While there are multiple ways in which this may be accomplished by suitable logic and processor algorithms, the simplest and most positive way of accomplishing this is merely by providing two fonts in the printer which are switchable. In the IBM 6640 Ink Jet Printer, font selection and character command signals are fed through the character generator which sends an address to the font ROS or memory and then scan information for that character is fed scan by scan back to the character generator 50, and then through drop placement logic 51 which outputs digital information indicative of the voltage to be applied to the charge electrode 4 through a digital to analog convertor 52. In the printer disclosed herein, however, a selection must occur at the fonts to feed the necessary information depending upon whether printing is accomplished in the vertical or the horizontal direction. For example, as illustrated in FIG. 5, wherein the letter H is being printed in mode A and mode B, when the carrier 7 is moving horizontally, and the scan of ink drops is vertically as shown in the schematic view of mode A, it is necessary that font A (associated with mode A) be selected. In this connection, the magnetic switch may employ a second pole **41*a* having associated therewith first and second contacts 42*a*, 43*a* which enables one or the other of the fonts depending upon the position of the pole 41*a*. In a like manner as before, the pole 41*a* may be switched from the contact 42*a* to select font A through an exclusive OR gate 53 or when the pole 41*a* is in its lower or second position against contact 43*a***, select font B. In this manner, the electronics associated with the printer need not be changed except for permitting font selection to occur so that the suitable characters may be printed either in the vertical or horizontal print directions. Numerous other font selection or changing schemes may be employed, for example, the scheme illustrated in U.S. Pat. No. 3,964,591 issued on June 22, 1976 permits font change merely by selecting different memory portions. In this connection, it should be recognized that the particular scheme employed is not important as long as one or another font may be selected when shifting from the horizontal to the vertical printing mode.

Typical drop placement logic such as that disclosed in Ser. No. 960,417 filed on Nov. 13, 1978 by Buehner, et al serves as the logic necessary to provide the necessary voltages for the DAC 52. However, depending upon the relative velocity of the carrier 7 along the print path, or the velocity of the paper when printing vertically, the sequential ink jet printing system with a variable number of guard drops such as disclosed in U.S. Pat. No. 4,086,601 may not necessarily be applicable. In this connection, aerodynamic drop interaction problems may be inhibited by utilizing the aspirator taught in U.S. Pat. No. 4,097,872 which issued on June 27, 1978.

Figure 6:
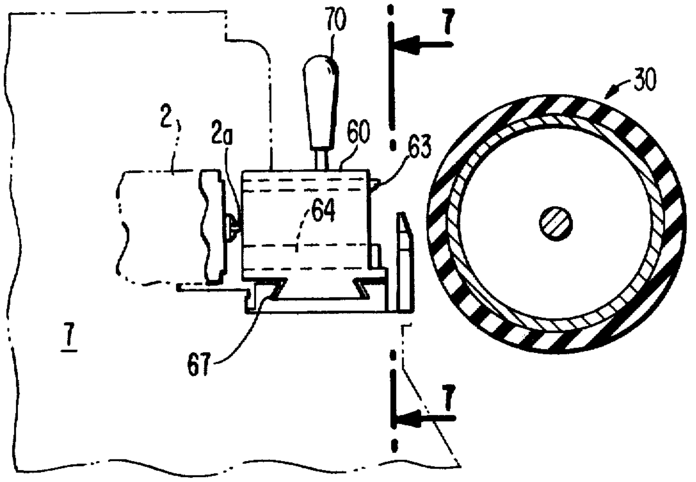
FIG. 6 is a fragmentary side elevational view of another embodiment of the apparatus of the present invention to enable printing both horizontally and vertically.
Figure 7:
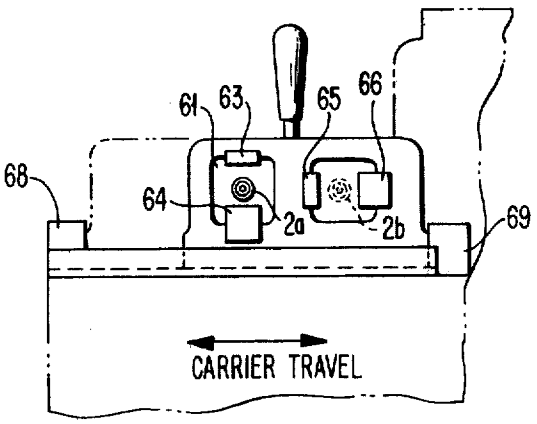
FIG. 7 is a fragmentary sectional view taken along line 7—7 of FIG. 6.

An alternate embodiment of apparatus constructed in accordance with the present invention is illustrated in FIGS. 6 and 7. For purposes of identification, like parts bear like numbers to the embodiment disclosed in FIGS. 1 through 5. In the embodiment illustrated, the shiftable ring or cylinder 13 is replaced by a carriage 60 having a pair of bores 61, and 62 respectively. Housed in the bores are deflection electrodes 63 and 64 (bore 61) and deflection electrodes 65 and 66 (bore 62). The carriage 60 may be mounted, for example, in a dove tail slide 67 to permit alignment of the bore 61 with the nozzle **2*a* or alignment of the bore 62 with the nozzle 2*a* depending whether horizontal or vertical printing (respectively) is desired. In order to effectuate accurate alignment of the nozzle 2*a* with the center of the bore 61 and 62 respectively, i.e., intermediate the deflection electrode 63, 64 and 65, 66, located at opposite ends of the slide path are stops 68 and 69 which serve to cooperate with the carriage 60 to limit its movement between the lefthand and righthand (see FIG. 7) positions allowing for both horizontal and vertical printing. As shown, motion of the carriage may be affected by, for example, a handle 70** connected to the carriage.

Thus the apparatus of the present invention permits shifting of the direction of printing of an ink jet printer by merely orienting the electric field in one of two mutually and substantially perpendicular directions substantially perpendicular to the intended path of the stream of ink drops. Moreover, by actuating one of the drive means associated with either the carrier or record receiving medium so that the electric field orientation is substantially perpendicular to the direction of motion, ink jet printing may occur in the selected direction.

Although the invention has been described with a certain degree of particularity, it is understood that the present disclosure has been made only by way of example and that numerous changes in the details of construction and the combination and arrangement of parts may be made without departing from the spirit and scope of the invention as hereinafter claimed:

What is claimed is:

1. An ink jet printing system comprising:

a nozzle for issuing a stream of ink drops;

a first electrode for charging the ink drops issuing from said nozzle in accordance with signals to be recorded;

a record receiving medium for forming images indicative of the signals imposed upon said ink drops, means for forming an electric field, means for orientating said field substantially perpendicular to said stream of ink drops, said electric field for effecting deflection of said ink drops in accordance with the amplitudes on the individual charges on said ink drops;

means for effecting relative movement between said nozzle and said record receiving medium in at least a selected one of vertical and horizontal directions, and means coupled to said means for orienting said electric field to position said electric field orthogonally to said selected one of horizontal and vertical directions.

2. An ink jet printing system in accordance with claim 1 wherein said means for forming said electric field comprises a pair of spaced apart deflection electrodes positioned on opposite sides of the intended path of said issuing streams of ink drops.

3. An ink jet printing system in accordance with claim 2 including a carrier mounting said nozzle, first electrode and deflection electrodes.

4. An ink jet printing system in accordance with claim 3 wherein said means for orienting said field comprises a ring defining a central bore; said deflection electrodes being mounted on said ring in said bore.

5. An ink jet printing system in accordance with claim 4 including a pedestal on said carrier, means coupling said ring to said pedestal for permitting rotational movement of said ring relative to said pedestal.

6. An ink jet printing system in accordance with claim 5 wherein said means coupled to said means for orienting said field comprises a handle connected to said ring, and means to limit the rotational movement of said ring.

7. An ink jet prnting system in accordance with claim 6 wherein said pedestal includes a sleeve circumscribing said ring, a radially extending slot in said sleeve to receive said handle.

8. An ink jet printing system in accordance with claim 7 wherein said means to limit rotational movement of said ring comprises adjustable stop means on said sleeve.

9. An ink jet printing system in accordance with claim 1 including a carrier mounting said nozzle, first electrode, and means for forming an electric field;

said means for effecting relative movement comprising: carrier drive means for effecting movement of said carrier in a path parallel to said record receiving medium, and record receiving medium drive means for effecting displacement of said record receiving medium in a path perpendicular to the path of movement of said carrier.

10. An ink jet printing system in accordance with claim 9 including means coextensively actuable to orientation of said electric field for selecting one or the other of said drive means.

11. An ink jet printing system in accordance with claim 10 including at least two type font means, and including means coextensively actuable to orientation of said electric field for selecting one or the other of said type font means.

12. An ink jet printing system in accordance with claim 3 including a second pair of deflection electrodes, mounting means on said carrier holding said first and second deflection electrode pairs in spaced apart relation, said deflection electrode pairs being positioned at substantially right angles to one another to form electric fields at substantially right angles to one another; said means for orienting said field comprising means for shifting said mounting means from a first position, wherein said first deflection electrode pair is positioned on opposite sides of the intended path of said issuing stream of ink drops, to a second position, wherein said second pair of deflection electrodes is positioned on opposite sides of the intended path of said issuing stream of ink drops.

13. An ink jet printing system in accordance with claim 12 including stop means on said carrier for limiting the movement of said mounting means between said first and second position.

14. An ink jet printer comprising:

a nozzle for issuing a stream of ink drops;

a first electrode for charging the ink drops issuing from said nozzle in accordance with signals to be recorded;

a record receiving medium for forming images indicative of the signals imposed upon said ink drops;

means for forming an electric field, and mechanical means for orienting said field between substantially a horizontal and vertical direction substantially perpendicular to said issuing stream of ink drops;

said electric field capable of effecting deflection of ink drops in accordance with the amplitudes of the individual charges on said ink drops;

and first drive means for moving said nozzle, first electrode and electric field forming means in a first direction substantially perpendicular to said issuing stream of ink drops, and second drive means for moving said record receiving medium in a second direction orthogonal to said first direction whereby images may be formed on said media in either said first or second direction.

15. An ink jet printer in accordance with claim 14 including means for assuring that said mechanical means for orienting said electric field positions said field at substantially a right angle to one of said first and second directions.

16. An ink jet printer in accordance with claim 15 wherein said means for forming said electric field comprises a pair of spaced apart deflection electrodes positioned on opposite sides of the intended path of said issuing streams of ink drops.

17. An ink jet printer in accordance with claim 16, including a carrier mounting said nozzle, first electrode and deflection electrodes, said first drive means being coupled to said carrier.

18. An ink jet printing system in accordance with claim 17 wherein said means for orienting said field comprises a ring defining a central bore; said deflection electrodes being mounted on said ring in said bore.

19. An ink jet printing system in accordance with claim 18 including a pedestal on said carrier, means coupling said ring to said pedestal for permitting rotational movement of said ring relative to said pedestal.

20. An ink jet printer in accordance with claim 19, including a sleeve circumscribing said ring and mounted on said pedestal.

21. An ink jet printer in accordance with claim 17 including a second pair of deflection electrodes, mounting means on said carrier holding said first and second deflection electrode pairs in spaced apart relation, said deflection electrode pairs being positioned at substantially right angles to one another to form electric fields at substantially right angles to one another; said means for orienting said field comprising means for shifting said mounting means from a first position, wherein said first deflection electrode pair is positioned on opposite sides of the intended path of said issuing stream of ink drops, to a second position, wherein said second pair of deflection electrodes is positioned on opposite sides of the intended path of said issuing stream of ink drops.

22. An ink jet printer in accordance with claim 14 including means coextensively actuable to orientation of said electric field for selecting one or the other of said drive means.

23. An ink jet printer in accordance with claim 22 including at least two type font means, and including means coextensively actuable to orientation of said electric field for selecting one or the other of said type font means.

24. An ink printer in accordance with claim 22 wherein said coextensively actuable means comprises switch means responsive to movement of said mechanical means.

25. A method of printing both horizontally and vertically with an ink jet printer, said printer having a nozzle for issuing a stream of ink drops;

a first electrode for charging the ink drops issuing from said nozzle in accordance with signals to be recorded;

deflection electrodes for forming an electric field for effecting deflection of ink drops in accordance with the amplitudes of the individual charges on said ink drops;

said nozzle, first electrode and deflection electrodes being mounted on a carrier;

a record receiving medium adjacent said carrier, and first drive means for moving said carrier in a first direction parallel to said record receiving medium and a second drive means for moving said record receiving medium in a second direction orthogonal to said first direction, including the steps of:

orienting said electric field in one of two mutually and substantially perpendicular directions substantially perpendicular to the intended path of said stream of ink drops;

actuating one of said first and second drive means so that the electric field orientation is substantially perpendicular to the direction of motion of said carrier or record receiving medium whose drive means is actuated.

* * * * *